United States Patent [19]

Kakligian

[11] Patent Number: 5,039,629

[45] Date of Patent: Aug. 13, 1991

[54] HYBRID CERAMIC COMPOSITION AND PROCESS FOR ITS MANUFACTURE

[75] Inventor: Markar M. Kakligian, Detroit, Mich.

[73] Assignee: Cor-Lin, Inc., Warren, Mich.

[21] Appl. No.: 353,541

[22] Filed: May 18, 1989

[51] Int. Cl.$^5$ .................... C03C 17/22; C03C 17/25
[52] U.S. Cl. .................... 501/32; 106/691; 264/60; 264/66
[58] Field of Search .................... 501/32; 106/691; 264/60, 66

[56] References Cited

U.S. PATENT DOCUMENTS 3,031,522  4/1962  Clark et al. .................... 501/32

OTHER PUBLICATIONS

Kingery, *Introduction to Ceramics*, John Wiley & Sons, 1970, pp. 51–56.

Primary Examiner—William R. Dixon, Jr.
Assistant Examiner—David M. Brunsman
Attorney, Agent, or Firm—Krass & Young

[57] ABSTRACT

A hard, corrosion resistant, non-porous hybrid ceramic material is fabricated from a greenware article comprised of a refractory powder, glass frit, and an acidic phosphate compound. The greenware article does not liquify during firing and hence retains structural and dimensional integrity. The article is fired in a two-stage process and may be applied to a variety of surfaces.

25 Claims, No Drawings

HYBRID CERAMIC COMPOSITION AND PROCESS FOR ITS MANUFACTURE

FIELD OF THE INVENTION

This invention relates generally to ceramics and in particular to high strength, corrosion resistant, non-porous hybrid ceramic-refractory materials and to methods for their manufacture.

BACKGROUND OF THE INVENTION

Ceramic materials are typically clay-based materials which generally are very hard and manifest a high degree of resistance to corrosion and extremes of temperature and accordingly, they have been extensively used in a variety of applications. Ceramics have become an increasingly significant engineering material for systems which encounter extreme temperatures, abrasive conditions or corrosive substances. For this reason, ceramic materials are utilized for lining furnaces, chemical reactors, pipelines and the like and for fabricating turbine blades, dies and other mechanical parts.

Ceramics manifest many superior properties which make them the material of choice for particular applications; however, various other properties of these same ceramics can limit their potential uses. Ceramic materials are generally brittle and hard to cut. They cannot be easily welded or joined to provide an impervious joint and cannot be readily machined to complex shapes. Furthermore, many ceramics are highly porous. Ceramics generally have a high degree of thermal expansion; consequently rapid heating or cooling can shock the materials causing them to crack. These undesirable properties make ceramics difficult to use in many applications, as for example in the lining for pipes or furnaces or for the fabrication into complex shapes.

The term "greenware" refers to a solid, usually firable, composition of a ceramic precursor material generally fabricated at ambient, or fairly low temperatures. Greenware is converted into a ceramic material when heated to a fairly high temperature. In some instances, it is possible to cast a body of ceramic greenware into a desired shape and to subsequently fire the greenware into a ceramic body having a desired final shape. However, in many instances this approach is not feasible because many greenware compositions tend to slump, or partially melt during firing making it impossible to retain a desired shape. "Refractory", is the term applied to materials which can withstand high temperatures without adverse effect. The term is of general and imprecise use, although it is frequently applied to various high temperature resistant phosphates, silicates and the like. While refractories have good high temperature properties, many of such materials are soft, porous and/or poorly resistant to corrosive environments.

What is needed in the art is a method whereby high performance materials which exhibit the best qualities of ceramics and refractories maybe fabricated. Such materials should exhibit toughness, corrosion resistance and an impervious surface and should be fabricated without any slumping or melting during the firing process. Materials of this type could be fabricated into greenware of a desired shape and fired into articles which maintain fairly precise geometric tolerances. While there are known in the prior art, a great number of ceramic compositions and a variety of processes for the fabrication of such ceramics, none are fabricated according to the process of the present invention and none exhibit the combination of hardness, corrosion resistance and thermal resistance manifested by the materials of the present invention. Because the materials of the present invention generally embody compositions akin to refractories and because they exhibit many of the beneficial properties of ceramics, together with select properties of refractories, the materials of the present invention are referred to as "Hybrid Ceramics." These and other advantages of this invention will be readily apparent to those skilled in the art from the, discussion, description and examples which follow.

BRIEF DESCRIPTION OF THE INVENTION

There is disclosed herein a method for fabricating a hard, corrosion-resistant hybrid ceramic article. In the first step of the process, 20-80% by weight of particulate refractory material; 10-30% by weight of particulate low-density glass; 0.25-1% by weight of a hardening agent, and 1-10% by weight of an acidic phosphate are mixed with water so as to form a suspension. The suspension is then cast into a mold and allowed to remain for a period of time sufficient to allow the particulate components of the suspension to settle. The mixture allowed to remain in the mold for a period of time sufficient to form a cohesive article of greenware. The item of greenware is then fired to produce a ceramic body.

The refractory material may in some instances, be advantageously selected from the group consisting essentially of: alumina, zirconia, tungsten carbide, silicon carbide, silicon nitride and combinations thereof. Preferably, the refractory material is of differing particle sizes; for example, the refractory material may include particles in a first size range of approximately 8-14 mesh, a second particle size range of approximately 14-24 mesh and a third particle size range of 325 mesh and finer.

The glass particles may preferably comprise particles of a low-density soda-lime glass and the glass may include at least one element from each of groups Ia, IIa, IIIa and IVa. The acidic compound may comprise phosphoric acid or a solution of aluminum phosphate, and the hardening agent is preferably magnesium oxide.

The heating is preferably carried out in a two-stage process. In the first stage, the temperature is slowly raised from ambient to approximately 1000° F. at a rate not exceeding 300° F. per hour. In a second stage, the heat is raised to 2350° F. at a rate of increase of approximately 750°-1000° F. per hour.

The present invention also includes ceramic articles fabricated by the process. These articles are characterized by a hardness in excess of 9 on the MOHS scale and do not undergo significant slumping or melting during firing.

DETAILED DESCRIPTION OF THE INVENTION

The hybrid ceramic material of the present invention is fabricated from one or more refractory materials such as alumina, zirconia, tungsten carbide, silicon carbide or silicon nitride; together with an acidic phosphate and a glassy fluxing agent. The ceramic composition may further include hardening materials such as magnesium oxide. The foregoing are mixed with water to form an aqueous slurry which is shaped into an article of greenware. The components of the greenware react during the firing process and can release volatile materials and/or generate heat and for this reason, firing is most advantageously carried out in a multi-step process.

It is generally preferred that the refractory material, glass and other solid components of the hybrid ceramic be in a particulate form and that the particles fall within specified size ranges. The particle sizes are selected so that the particles pack to fill voids therebetween and provide a dense, compact article. Such packing reduces porosity, increases strength and facilitates consolidation of the material during firing while avoiding the necessity of significant melting during consolidation. Theories of mechanical packing of particulates, particularly as related to ceramic materials, are well-known to those of skill in the art and can be found for example, in *The Packing of Particles*, Westman, A. E. R. and Gill, H. R. J.AM.CERAM.-SOC. 13, 767 1930 or in *Model for Compaction of Ceramic Powders*; Schwartz, E. G. and Weinstein A. S., J.AM.CERAM.-SOC., 48, 346, 1965. In general it is desirable that the refractory material be of various particle sizes and in one particular instance it has been found most advantageous to employ a first group of refractory particles of approximately 8-14 mesh, a second group of refractory particles of approximately 14-24 mesh and a third group of refractory particles of 325 mesh and finer. In conjunction with this distribution of refractory particles it has also been found useful to utilize glass particles of approximately 20-30 mesh as well as particles of magnesium oxide, or other hardening agent of approximately 200 mesh.

The composition used for the fabrication of the ceramic of the present invention also includes glass particles. These particles, typically of 20-30 mesh, comprise approximately 20-30% of the composition. The glass particles, also referred to as "glass frit," provide for fluxing action during the firing of the ceramic materials and/or react with the other components of the mixture to form the body of ceramic. As will be explained in greater detail, the glass also serves to bind together the body of ceramic material and to seal pores therein.

A most important feature of the glass frit is that it provides for controlled fluxing of the various components of the ceramic during the firing process. Controlled fluxing refers to the fact that the glass includes a variety of elements therein which act in a "time release" manner so as to provide for a sequential fluxing action wherein fluxing occurs over a range of time and/or temperatures thereby allowing the greenware article to retain its shape during firing thus eliminating slumping or other dimensional changes.

In order to provide for controlled fluxing, the glass should include a plurality of elements of different valences. More specifically, the glass should include elements from each of group Ia, IIa, IIIa and IVa together with oxygen. It has been found that the type of glass commonly referred to as low density soda lime glass exhibits significant utility in the present invention. One glass composition of this type includes approximately 73% $SiO_2$, approximately 15% $Na_2O$, approximately 7% CaO, approximately 4% MgO and approximately 1% $Al_2O_3$. Many other glass compositions having different proportions from the foregoing also exhibit utility in the present invention. It has also been found that the sodium oxide portion of the glass can be replaced in part, or in total, with $Cs_2O$ and/or $K_2O$ and that the calcium oxide portion of the glass can similarly be replaced all, or in part, with BeO and/or BaO. In still other instances, borosilicate-type glasses have utility in the present invention.

Fabrication of the ceramic of the present invention also involves the use of an acidic phosphate compound and preferably a hardening agent. The acid initially reacts with the various other components at room temperature so as to produce a solid product and in this way gives strength and cohesiveness to the ceramic greenware. It has been found most convenient to utilize mono aluminum phosphate as the acidic component although other acidic, metallic phosphates, as well as phosphoric acid may be similarly employed. Mono aluminum phosphate has the formula of $Al(H_2PO_4)_3$ and is generally provided in the form of a 50% aqueous solution. Mono aluminum phosphate reacts with hardening agents such as magnesium oxide at room temperature, in an exothermic reaction, to form a solid product comprised of aluminum phosphates, magnesium hydrogen phosphates and aluminum hydrogen phosphates. This material further reacts at higher temperatures to form other aluminum and magnesium phosphate compounds. These reactions are known to those of skill in the art and may be found, for example, in the journal of the *Ceramic Society of Japan* 82, 12, 1974; Ando et al. Mono aluminum phosphate itself, decomposes as its temperature is increased so as to create various phosphates and oxides of aluminum. Various of the acids of phosphorous or compounds thereof may be similarly employed provided such materials undergo reactions similar to the foregoing with the various components of the ceramic precursor mixture.

While magnesium oxide is a preferred hardening agent because of its low cost and good reactivity other hardening agents such as group IIa oxides and the like may be similarly employed. It has been found that the crystallinity of the final ceramic is related to the grain size of the hardening agent and for this reason it is generally preferred that the hardening agent have a particle size of approximately 200 mesh or finer.

The entire range of reactions occurring during the preparation of the ceramics of the present invention are not fully understood. It is thought that the glass components undergo reactions which serve to seal porosity of the final ceramic product. It is also believed that the oxides of silicon and sodium react with water to form sodium silicate compounds of the type collectively known as water glass. Water glass will react with acids to precipitate an insoluble gel material. Heating of the gel produces a solid commonly known as silica gel.

It is expected that sodium silicates produced from the ceramic precursor mixture react during fabrication to coat the solid particles with a coating of glutinous silica gel, and that after firing, this coating seals porosity in the material and increases strength of the ceramic. While the presence of water glass is postulated, it is to be understood that this chemical species may be present in a transitory or "nascent" phase, if at all.

In order to prepare a hybrid ceramic article in accord with the present invention, various components of the ceramic precursor are mixed together so as to form a slurry or suspension. This suspension is then cast into a mold and the particular components of the suspension are allowed to settle into, and fill, the mold. At least a portion of the aqueous component of the suspension is preferably removed from the mold, as for example by decanting or runoff or percolation, in those instances where the mold is porous. After removal of water, the mixture is allowed to remain in the mold for a period of time sufficient to form a cohesive article of greenware and the greenware article is then fired to form the hybrid ceramic article.

The firing in advantageously carried out in a two step process. In a first step, heating is carried out at a relatively slow rate so as to drive off excess moisture and to allow reaction between the various components to take place. If the first step of the heating is carried out too rapidly damage to the ceramic article may result from excess heat generated by the chemical reaction of the components or by the release of water or volatile reaction by-products. Preferably, the first stage of heating is carried out to a temperature of approximately 1000° F. and heat is preferably applied at a rate not exceeding several hundred degrees F. per hour. The thicker the bulk of the article, the slower the initial heating. Once a temperature of 1000° F. is achieved, the rate of temperature rise can be increased significantly. In the second stage, heating is carried out to approximately 2500° F. after which the article is cooled and removed from the kiln.

The present invention will best be understood with reference to the following examples, detailing the fabrication of specific ceramic compositions.

EXAMPLE 1

In this example, 335.6 grams of fused alumina of approximately 8–14 mesh size was mixed together with 136.5 grams of fused alumina of approximately 14–24 mesh, 207.1 grams of alumina of 325 mesh and finer (tabular alumina powder from the Alcoa Corporation) and 69 grams of magnesium oxide of 200 mesh (Mag-Chem 10, hard burned, from the Martin Marietta Corp.). To this mixture was added 167.5 grams of soda lime glass frit of 20–30 mesh size. This glass is comprised of 73% silicon dioxide, 15% sodium oxide, 7% calcium oxide, 4% magnesium oxide and 1% aluminum oxide and it has an index of refraction of 1.515. The foregoing dry components were mixed together in a first container to form a uniform mixture.

66.0 grams of a 50% solution of mono aluminum phosphate (supplied by the Stauffer Chemical Corporation) and 60.4 grams of distilled water were mixed together in a second container. A blade-type stirrer, turning at a velocity of approximately 1800 rpm was introduced into the container of the dry components and the liquid was added thereto, with stirring. Mixing was continued for approximately three minutes at which time the fluid mass appeared uniform and a disagreeable odor was noticed.

The thus-prepared suspension was poured into a mold, which was affixed to a vibrating mechanism. Vibration of the mold caused the particulate components of the mixture to settle and form a dense mass in the bottom of the mold while the excess aqueous portion of the mixture rose to the top and was poured off. By overfilling the mold, it was assured that the entirety of the cavity was filled with a solid body of material. It has been found that the pouring should be accomplished within ten minutes or less since viscosity of the mixture increases over time and if pouring is too slow, the mixture will become too thick to allow settling.

Once the mold was filled, the mixture therein was allowed to set for 24 hours so as to develop green strength. The greenware article was removed from the mold and inserted into a kiln. Temperature in the kiln was increased from ambient to 1000° F. at a rate of not more that 300° F. per hour. During the initial heating, the kiln was exhausted to remove fumes and moisture released from the article. Once the kiln had reached 1000° F. the rate of temperature increase was changed to approximately 750°–1000° F. per hour and the kiln was heated to 2350° F., at which time it was shut down and allowed to cool for 24 hours. The kiln was opened and the finished hybrid ceramic article removed. The thus-produced ceramic body was found to have a Mohs hardness of approximately 9.0 and be resistant to abrasion, corrosion, high temperatures and thermal shock.

Specifically, the material produced in the foregoing example was found to have a coefficient of thermal expansion similar to that of quartz. It could be heated in excess of 3000° F., and plunged into ice water without any damage. The hybrid material was unchanged after heating to 4000° F. and was not attacked by either acidic or basic solutions.

The dielectric constant of this material was found to be extremely low. In a standard test a voltage in excess of 25 Kv was applied to a pair of plate-type electrodes on opposite sides of a one-inch thick body of the material and a leakage current of less than 0.003 MA was noted after three minutes.

The thus-prepared hybrid ceramic material combined the hardness, corrosion resistance and low porosity of conventional ceramics with the temperature stability of refractories. Furthermore, this material was found to have a coefficient of thermal expansion far less than ceramics or refractories and to be very resistant to cracking when dropped or struck.

Similar experiments were carried out substituting zirconium oxide, tungsten carbide, silicon nitride and silicon carbide for the alumina in the foregoing example and similar high quality hybrid ceramics were produced thereby.

EXAMPLE 2

In this example, a composition, generally similar to that of Example 1, was applied to the interior surface of a ferrous pipe so as to provide a lining suitable for conditions encountered in geothermal applications. A generally cylindrical filler member having a diameter less than the inside diameter of the pipe was placed into the pipe in concentric relationship therewith so as to create a mold cavity. A suspension as described with reference to Example 1, was poured into the space between the pipe and the filler member and the pipe was vibrated to facilitate settling of the mixture therein. Vibrating and filling was carried out until substantially all of the length of the pipe was filled with solid material. Excess water was displaced by subsequent solid components and the cavity defined by the filler and pipe was occupied by the ceramic precursor mixture. Vibration was terminated and the pipe and filler allowed to remain at ambient temperature for approximately 24 hours at which time the filler was removed leaving a coherent, self-supporting article of greenware within, and lining the pipe.

The pipe with the greenware lining, was placed in a kiln and a protective nitrogen atmosphere flowed therethrough. It has been found important to provide a non-oxidizing atmosphere during heating steps when the hybrid ceramic of the present invention is being applied to ferrous articles. A non-oxidizing atmosphere is defined to include a vacuum; an atmosphere of inert gases such as argon, nitrogen, carbon dioxide, helium and the like; as well as a reducing atmosphere including gases such as ammonia, hydrogen, carbon monoxide, methane and the like.

The pipe and its associated greenware liner was heated in the nitrogen atmosphere from ambient to 1000° F. over a period of four hours, with care being taken to limit the temperature rise to about 300° F. per hour. During this first stage of the heating, fumes and moisture were exhausted from the kiln, while entry of ambient atmosphere was prevented.

Once the article had attained a temperature of 1000° F., the rate of heating was increased to approximately 800° F. per hour and the article heated for approximately two more hours. Once the kiln attained approximately 2400° F., power was shut down and the kiln was allowed to cool to room temperature. Such cooling took approximately 24 hours. The kiln remained closed during cooling and the inert atmosphere was maintained.

The coated pipe was removed from the kiln and was found to have a monolithic ceramic coating thereon. The coating was impervious to moisture, tightly bonded to the pipe and resistant to thermal shock, temperature cycling and corrosive materials. It is anticipated that similar procedures may be employed to line furnaces, reactors, rollers and the like. For example, the exterior of a cylindrical roller surface can be coated with a hybrid ceramic by disposing an outer mold sleeve thereabout and forming a greenware coating on the roller. It is further anticipated that precursor suspensions for pipe linings may be advantageously applied by rotating the pipe about its central axis and allowing centrifugal force to distribute the mixture uniformly thereabout.

As mentioned hereinabove, the products obtained by the process of the present invention are unique insofar as they manifest (1) abrasion resistance, (2) corrosion resistance, (3) the ability to withstand continuous high temperature, (4) resistance to thermal and mechanical shock, (5) a negligible coefficient of thermal expansion, (6) a low rate of heat transfer, (7) a near zero dielectric constant and (8) superior mechanical properties. While some of these different properties have heretofore been achieved in separate ceramic or refractory compositions the combinations of such properties in a single material is heretofore unknown. The hybrid ceramic materials of the present invention have a wide utility as liners for chemical reactors and piping utilized in chemical production, oil production, oil refining and geothermal systems. The ceramic materials of the present invention also have significant utility in the field of production and shaping as dies, wear surfaces, molds and the like. They are also useful as refractory liners for a variety of applications. The unique combination of properties of the ceramics of the present invention also make them ideally suited as a core material for induction heating and as a thermal shield for aerospace applications.

It will be appreciated that in keeping with the principles disclosed herein, the invention may be practiced utilizing a variety of compositions and under a variety of fabrication conditions. The foregoing discussion, description and examples are merely meant to be illustrative of particular embodiments of the present invention and are not meant to be limitations upon the practice thereof. It is the following claims, including all equivalents, which define the scope of the invention.

I claim:

1. A method of fabricating a hard, corrosion resistant hybrid ceramic article comprising the steps of:
   I. mixing together, by weight:
      a) 20-80% of particulate, refractory material;
      b) 10-30% of particulate, low-density glass;
      c) 0.25-1% of a hardening agent;
      d) 1-10% of an acidic phosphate and the remainder water, so as to form a suspension;
   II. casting the suspension into a mold;
   III. allowing the particulate components of the suspension to settle in the mold;
   IV. allowing the mixture to remain in the mold for a period of time sufficient to form a cohesive article of greenware; and
   V. heating the greenware article.

2. A method as in claim 1 wherein the step of mixing the particulate refractory comprises mixing a refractory from the group consisting essentially of: alumina, zirconia, tungsten carbide, silicon carbide, silicon nitride and combinations thereof.

3. A method as in claim 1, wherein the step of mixing includes the step of selecting alumina as said refractory.

4. A method as in claim 3 wherein the step of selecting alumina comprises the step of selecting alumina of differing particle sizes.

5. A method as in claim 4, wherein the step of selecting alumina of different particle sizes comprises selecting alumina of particles in a first size range of approximately 8-14 mesh, a second particle size range of approximately 14-24 mesh and a third particle size range of 325 mesh and finer.

6. A method as in claim 5, wherein the step of selecting alumina of differing particle size ranges comprises selecting approximately: 0-40% by weight of alumina particles of 8-14 mesh; 10-50% by weight of alumina particles of 14-24 mesh and approximately 10-30% by weight of alumina particles of 325 mesh and finer.

7. A method as in claim 1, wherein the step of mixing particulate, low-density glass comprises mixing low-density soda lime glass.

8. A method as in claim 1, wherein the step of mixing particulate, low-density glass comprises mixing glass particles of approximately 20-30 mesh.

9. A method as in claim 1, wherein the step of mixing low density glass comprises mixing a glass including oxygen and at least one element from each of groups Ia, IIa, IIIa and IVa of the periodic table.

10. A method as in claim 1, wherein the step of mixing low density glass comprises mixing a glass including: silicon, sodium, calcium, magnesium, aluminum and oxygen.

11. A method as in claim 1, wherein the step of mixing a hardening agent comprises mixing magnesium oxide.

12. A method as in claim 11, the step of mixing magnesium oxide comprises mixing magnesium oxide of approximately 200 mesh.

13. A method as in claim 1, wherein the step of mixing an acidic phosphate comprises mixing phosphoric acid.

14. A method as in claim 1, wherein the step of mixing an acidic phosphate comprises mixing mono aluminum phosphate.

15. A method as in claim 14, wherein the step of mixing mono aluminum phosphate comprises mixing an aqueous solution containing approximately 50% mono aluminum phosphate.

16. A method as in claim 1, wherein the step of allowing the particulate components of the suspension to settle includes the further step of vibrating the mold.

17. A method as in claim 1, wherein the step of heating the greenware article comprises heating the article at a temperature, and for a time, sufficient to convert at least a portion of the greenware article into potassium aluminum phosphate.

18. A method as in claim 1, wherein the step of heating the greenware article comprises heating the greenware article in a non-oxidizing atmosphere.

19. A method as in claim 1, wherein the step of heating the greenware article comprises first heating the greenware article to a temperature of 1,000° F. at a maximum temperature rate increase of no more than 300° F. per hour and then heating the article to a temperature of at least 2350° F. at a maximum temperature rate of increase of no more than 1000° F. per hour.

20. A method as in claim 1, wherein the step of heating the greenware articles includes the further step of exhausting volatile materials given off by the article.

21. A method as in claim 1, wherein the step of allowing the mixture to remain in the mold for a period of time sufficient to form a cohesive article comprises allowing the mixture to remain in the mold for at least 24 hours.

22. A method as in claim 1, wherein the mold is a hollow, tubular body and the step of casting the suspension into the mold includes the further steps of:
inserting a cylindrical filler member having an outside diameter less than the inside diameter of the tubular body into the interior of the tubular body; and
casting the suspension into the space between the tubular body and the filler member.

23. A method as in claim 1, wherein the mold is a tubular body and the step of casting the suspension into the mold comprises the further step of rotating the cylindrical mold about its longitudinal axis and centrifugally retaining the suspension therein.

24. A hybrid ceramic article fabricated according to the process of claim 1.

25. A method of fabricating a hard, corrosion resistant hybrid ceramic article comprising the steps of:
I. mixing together so as to form a suspension:
   a) 20-80% by weight of a particulate refractory material selected from the group consisting essentially of: alumina, zirconia, tungsten carbide, silicon nitride, silicon carbide and combinations thereof, said refractory material including a first group of particles of approximately 8-14 mesh, a second group of particles of approximately 14-24 mesh and a third group of particles of at least 325 mesh;
   b) 10-30% by weight of particles of a glass composition including: silicon, sodium, calcium, magnesium, aluminum and oxygen;
   c) 0.25-1.0% by weight of magnesium oxide;
   d) 1-10% by weight of an acidic phosphate compound; and
   e) remainder water;
II. casting the suspension into a mold;
III. allowing the particulate components of the suspension to settle in the mold;
IV. removing at least a portion of the water from the mold;
V. allowing the mixture to remain in the mold for a period of time sufficient to form a coherent article of greenware;
VI. heating the greenware article to a temperature of approximately 1000° F. at a rate of heating which does not exceed 380° F. per hour; and
VII. heating the greenware article from a temperature of 1000° F. to a temperature of at least 2350° F. at a rate of heating which does not exceed 1000° F. per hour.

* * * * *